(12) United States Patent
Hosoe et al.

(10) Patent No.: US 6,326,824 B1
(45) Date of Patent: Dec. 4, 2001

(54) TIMING SYNCHRONIZING SYSTEM, DEVICES USED IN THE SYSTEM, AND TIMING SYNCHRONIZING METHOD

(75) Inventors: Koji Hosoe; Jun Funaki; Toshiyuki Shimizu; Michio Numata, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/626,963

(22) Filed: Jul. 27, 2000

(30) Foreign Application Priority Data

Nov. 10, 1999 (JP) .................................................. 11-320290

(51) Int. Cl.[7] ...................................................... H03L 7/00
(52) U.S. Cl. ......................... 327/160; 377/122; 377/124; 377/44
(58) Field of Search ..................................... 327/160, 151; 377/122–126, 107, 118, 44; 710/58, 61

(56) References Cited

U.S. PATENT DOCUMENTS

| | | | | |
|---|---|---|---|---|
| 4,274,107 | * | 6/1981 | Tamura et al. | 358/29 |
| 4,374,358 | * | 2/1983 | Hirose | 324/77 |
| 5,298,798 | * | 3/1994 | Furumiya | 327/306 |
| 5,559,765 | * | 9/1996 | Andou | 369/32 |
| 6,049,358 | * | 4/2000 | Jun | 348/546 |

FOREIGN PATENT DOCUMENTS

| | | |
|---|---|---|
| 7-56862A | 3/1995 | (JP) . |
| 7-230440A | 8/1995 | (JP) . |
| 11-46189A | 2/1999 | (JP) . |

* cited by examiner

Primary Examiner—Timothy P. Callahan
Assistant Examiner—An T. Luu
(74) Attorney, Agent, or Firm—Staas & Halsey LLP

(57) ABSTRACT

An initial value generation circuit generates an initial value taking into consideration the a time delay when a signal is transmitted through the signal wires between a pilot device and other devices, and a processing delay caused in respective devices. When a device receives a system synchronizing signal form another device, the device sets an initial value in a counter. Thereby, the counter value of a counter in a pilot device and counter values of counters in the other devices are made to coincide with each other.

6 Claims, 12 Drawing Sheets

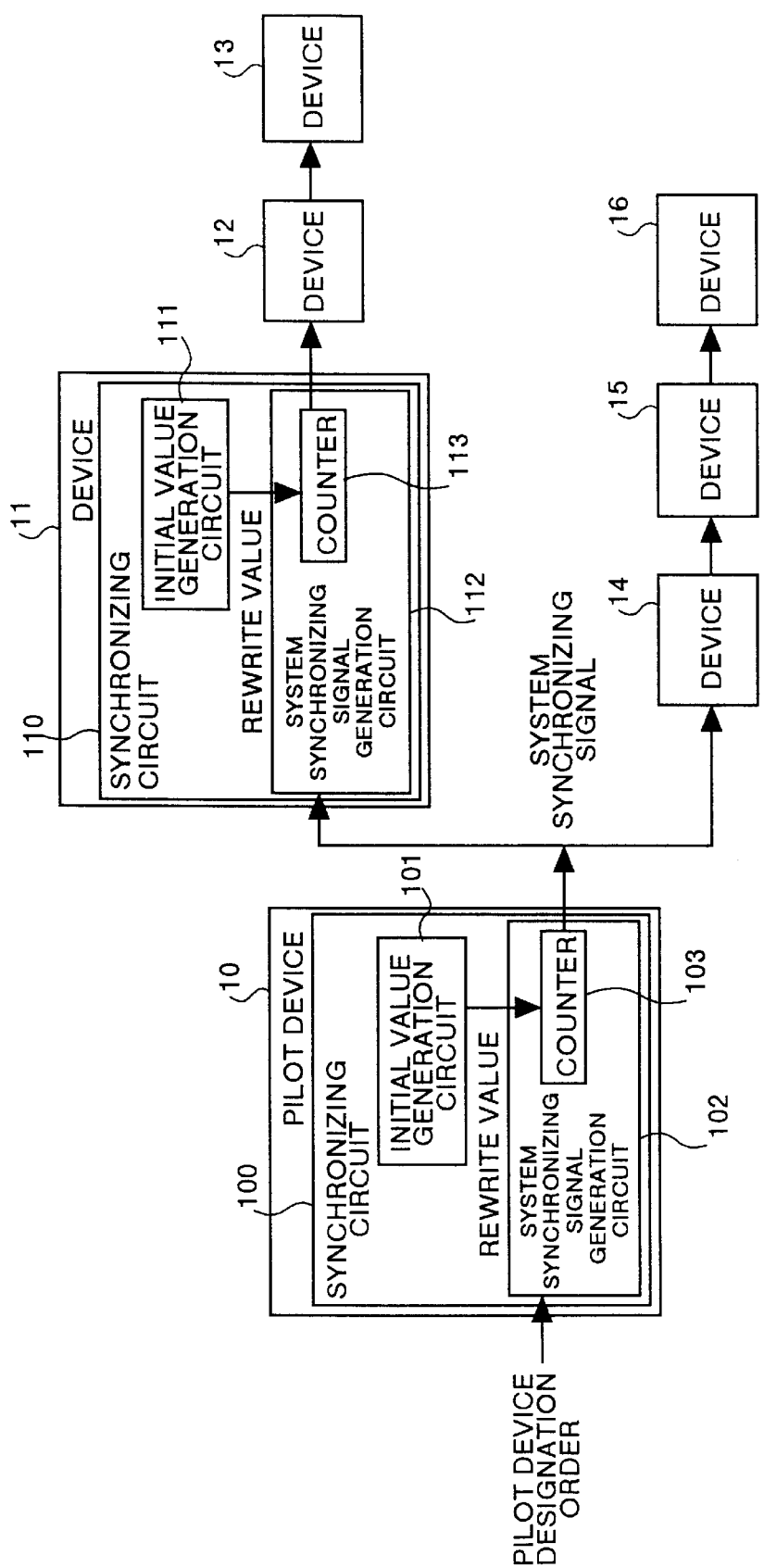

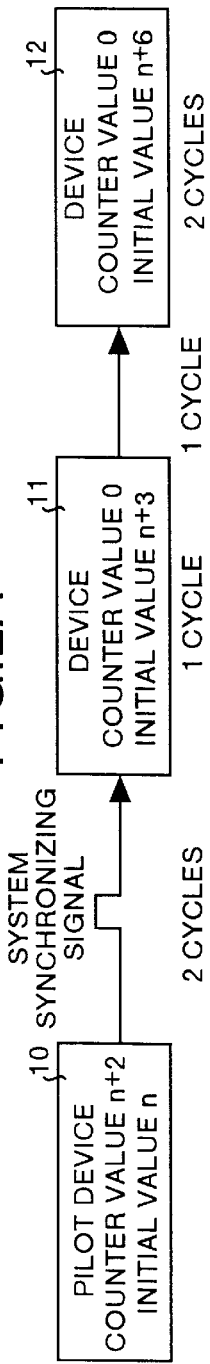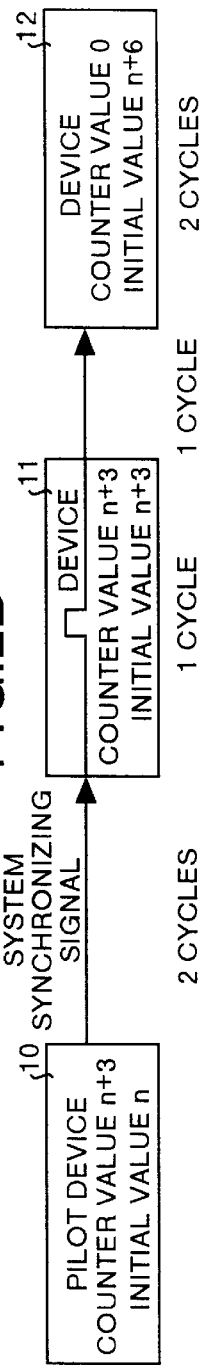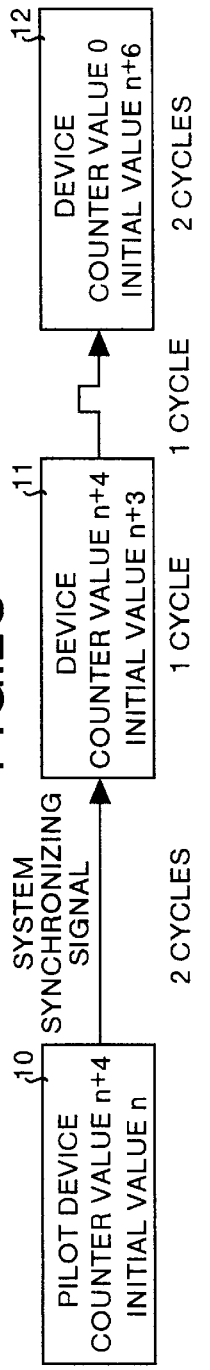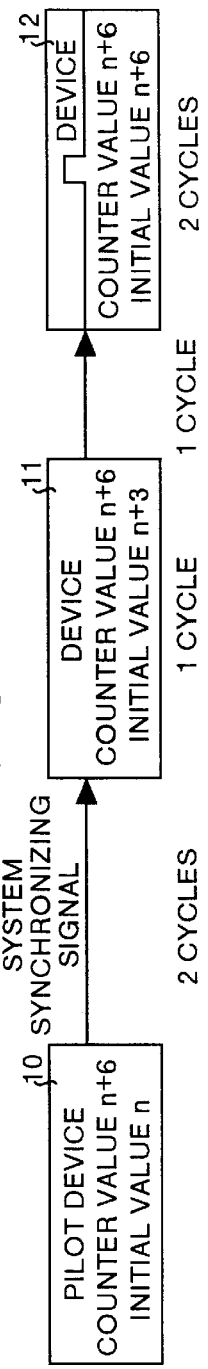

TIMING SYNCHRONIZING SYSTEM, DEVICES USED IN THE SYSTEM, AND TIMING SYNCHRONIZING METHOD

FIELD OF THE INVENTION

The present invention relates to a timing synchronizing system including a pilot device for sending out a synchronizing signal and a plurality of other devices which operate at the same operation timing as the pilot device on the basis of the synchronizing signal received from the pilot device, the devices used in the timing synchronizing system, and a timing synchronizing method. In particular, this invention relates to a timing synchronizing system, devices used in the timing synchronizing system, and a timing synchronizing method which are capable of ensuring the synchronization of operation timing of respective devices.

BACKGROUND OF THE INVENTION

In the configuration of conventional computer systems, a plurality of LSIs and so on are mounted on a mother board. In many cases, it becomes necessary to reset these LSIs simultaneously or conduct some setting on these LSIs simultaneously. In such computer systems, therefore, respective LSIs are connected to a system synchronizing signal supply unit, which supplies a system synchronizing signal, in parallel by signal wires. By utilizing the system synchronizing signal transmitted via the signal wires, respective LSIs ensure the synchronization of operation timing.

The distance between the system synchronizing signal supply unit and each LSI differs depending upon the position where the LSI is disposed. If these LSIs are connected simply, therefore, the system synchronizing signal is delayed by the signal wire. As a result, there occurs discrepancy in operation timing.

In order to prevent the transmission delay of the synchronizing signal caused by the disposition position of such LSIs, therefore, line lengths of respective signal wires are adjusted in the prior art so that line lengths of signal wires as far as respective LSIs may become equal.

If the line lengths of signal wires are adjusted as in the prior art, however, the line length of the signal wire as far as each LSI must be made equal to the longest line length. This results in a problem of an increased amount of signal wire and complicated disposition of signal wires.

Especially, if the system scale becomes large and the synchronization of operation timing of devices disposed so as to extend over a plurality of casings must be maintained, then the line length becomes very long and such a situation cannot be coped with mere line length adjustment.

In the case where a plurality of devices (such s LSIs) operate at the same operation timing, therefore, how to ensure the synchronization of such operation timing becomes an extremely important problem.

SUMMARY OF THE INVENTION

It is an object of the present invention to provide a timing synchronizing system, integrated circuits, a timing synchronizing method, and a computer-readable recording medium having a program recorded thereon to cause the method to be executed on a computer, which makes it possible to ensure the synchronization of operation timing among a plurality of devices activated at the same operation timing.

According to one aspect of the present invention, counting by a first counting unit is started when the pilot device sends a synchronizing signal, and a second counting unit is made to conduct counting from a predetermined initial value when a device has received the synchronizing signal from the pilot device. As a result, it becomes possible to synchronize the operation timing of the pilot device and the devices efficiently.

According to another aspect of the present invention, a device sends out a synchronizing signal as a pilot device and starts counting using a counting unit, if the device has received a predetermined pilot device designation order. When the device has accepted a synchronizing signal, the device causes the counting unit to conduct counting from a predetermined initial value. As a result, the devices can be used as both the pilot device and ordinary devices.

Further, if the device has received the synchronizing signal, the device functions as the ordinary device and sets an initial value corresponding to a transmission delay value of the synchronizing signal as far as a transmission source device, in the counting unit. After setting the initial value, the device starts counting operation using the counting unit. As a result, it becomes possible to synchronize the operation timing of the devices efficiently while taking into consideration the transmission delay value of the synchronizing signal between a transmission source device and the device.

Further, the device functions as the ordinary device and starts operation corresponding to a trigger, if the device receives the trigger and if the count value of the counting unit is a predetermined value. As a result, devices can be made to function simultaneously in response to a trigger.

Further, the device sends out the synchronizing signal and effects control so as to cause the counting unit to conduct count from a predetermined initial value, if the device receives a predetermined pilot device designation order. As a result, desired counting control responsive to a pilot device designation order can be effected.

Further, the device outputs the trigger corresponding to operation if the device receives a pilot device designation order and a predetermined operation start order. As a result, it is possible to output a trigger only when two conditions, i.e., receipt of the pilot device designation order and receipt of the operation start order, are satisfied.

According to still another aspect of the present invention, counting by a first counting unit is started when a pilot device sends a synchronizing signal to other devices. When a device has received the synchronizing signal from the pilot device, a second counting unit is made to conduct counting from a predetermined initial value. As a result, the operation timing of the pilot device and the other devices can be synchronized efficiently.

Other objects and features of this invention will become apparent from the following description with reference to the accompanying drawings.

BRIEF DESCRIPTION OF THE DRAWINGS

FIG. 1 is a block diagram showing the system configuration of a timing synchronizing system according to a first embodiment of the present invention;

FIG. 2A to FIG. 2D are diagrams showing the concept of establishing the operation timing synchronization between a pilot device and other devices shown in FIG. 1;

DESCRIPTION OF THE PREFERRED EMBODIMENTS

Figure 3:
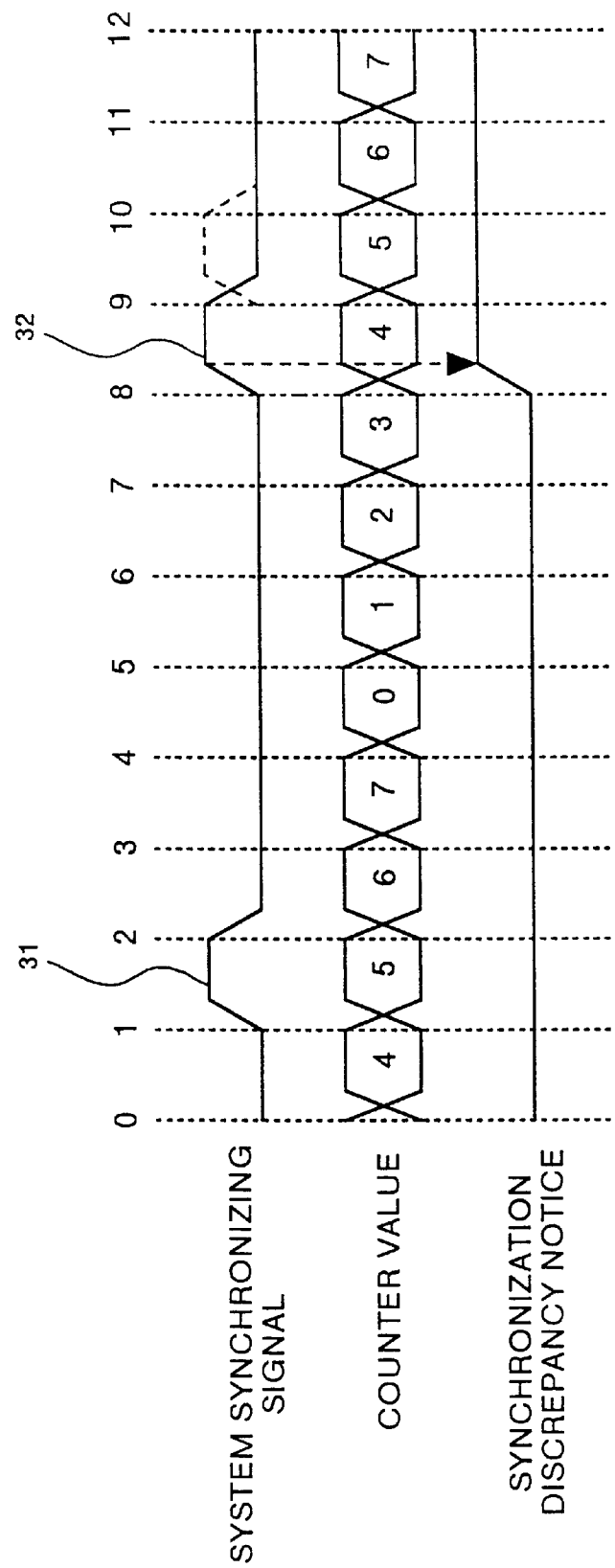
FIG. 3 is a diagram showing how to detect synchronizing discrepancy of operation timing in devices shown in FIG. 1.

Hereafter, preferred embodiments of a timing synchronizing system, devices used in the timing synchronizing system, and a timing synchronizing method according to the present invention will be described in detail by referring to the drawings. It is assumed here that clocks of devices (such as LSIs) are already synchronized. Furthermore, it is assumed that devices are aligned in operation timing by a synchronizing signal, and a predetermined operation is started when each device is triggered.

FIG. 1 is a block diagram showing the system configuration of a timing synchronizing system according to a first embodiment of the present invention. In the timing synchronizing system shown in FIG. 1, a pilot device 10 and devices 11 to 16 are synchronized in operation timing by using a system synchronizing signal output from the pilot device 10.

In the prior art, line lengths as far as the devices 10 to 16 are adjusted respectively in order to synchronize the devices in operation timing. In the present timing, synchronizing system, however, the devices 10 to 16 are synchronized in operation timing by adjusting count values of counters respectively disposed within the devices 10 to 16.

If the line adjustment of signal wires is performed as in the prior art, there occurs a problem that signal wires disposed in the devices become complicated and the amount of physical resources such as signal wires increases. Accordingly, discrepancy in length among signal wires is permitted by adjusting the count values of the counters on the basis of delay values of the system synchronizing signal depending upon the signal wire lengths.

As shown in FIG. 1, the present timing synchronizing system includes a pilot device 10 which sends a system synchronizing signal to devices 11 and 14, and devices 11 to 16 each of which receives a system synchronizing signal from a different device and sends the system synchronizing signal to another different device. Devices 13 and 16 serving as terminal devices need not send the system synchronizing signal.

The pilot device 10 includes a synchronizing circuit 100. The synchronizing circuit 100 includes at least an initial value generation circuit 101 and a system synchronizing signal generation circuit 102. The system synchronizing signal generation circuit 102 incorporates a counter 103. The initial value generation circuit 101 is a circuit for generating an initial value to be set in the counter 103 on the basis of initial value information.

The system synchronizing signal generation circuit 102 starts count operation when a pilot device designation order is asserted and system reset is canceled. When a predetermined count value is reached, the system synchronizing signal generation circuit 102 outputs one pulse as a system synchronizing signal. Thereafter, the system synchronizing signal generation circuit 102 outputs the system synchronizing signal at fixed time intervals in the same way.

The counter 103 is a count unit for successively conducting count operation according to the clock, beginning from the initial value generated by the initial value generation circuit 101 or from zero. After the count value has reached a predetermined value, the counter proceeds to zero. In other words, the counter 103 performs cyclic count operation.

In the same way as the pilot device 10, each of the devices 11 to 16 includes a synchronizing circuit 110. The synchronizing circuit 110 includes at least an initial value generation circuit 111 and a system synchronizing signal generation circuit 112 incorporating a counter 113. For convenience of description, only the detailed configuration of the device 11 is illustrated. However, the devices 12 to 16 also have the same configuration as the device 11.

The initial value generation circuit 111, the system synchronizing signal generation circuit 112, and the counter 113 have configurations similar to the counterparts of the pilot device 10. Upon accepting the system synchronizing signal, however, the system synchronizing signal generation circuit 112 sets an initial value generated by the initial value generation circuit 111 in accordance with initial value information, in the counter 113, starts the count operation, and sends a system synchronizing signal to the device 12.

Such initial value information is set so that at start of count operation the counter 113 will have the same value as the count value of the counter 103 of the pilot device 10 at that time. Between the pilot device 10 and the device 11, there is a delay of the system synchronizing signal due to the signal wire. Taking such a delay of the system synchronizing signal into consideration, the initial value information is set.

In this way, the device 11 sets a count value in the counter 113 in accordance with initial value information determined by taking the delay of the system synchronizing signal into consideration. Thus the device 11 makes the value of the counter 113 equal to that of the counter 10 of the pilot device 10. As a result, synchronization of operation timing between the pilot device 10 and the device 11 can be established.

Furthermore, the device 11 relays the system synchronizing signal to the device 12. In the device 12 as well, the same processing as that of the device 11 is performed. Therefore, the device 12 can be synchronized to the pilot device 10 and the device 11 in operation timing. Furthermore, the devices 13 to 16 can also be synchronized in operation timing to the pilot device 10 in the same way.

Finally, however, it is necessary to make the count value of the device 13 or 16 located at the terminal match the count value of the pilot device 10. Therefore, each of the pilot device 10 and the devices 11 to 16 must have a counter capable of counting up to at least the initial value information of the device 13 or 16. In addition, the repetition period of the system synchronizing signal sent by the pilot device 10 must be at least the initial value of the device 13 or 16.

The concept of establishing the operation timing synchronization between the pilot device 10 and the devices 11 to 12 shown in FIG. 1 will now be described. For convenience of description, description will be given by taking the pilot device 10, the device 11 and the device 12 as an example.

FIG. 2A to FIG. 2D are diagrams showing the concept of establishing the operation timing synchronization between the pilot device 10 and the devices 11 to 16 shown in FIG. 1. As shown in these figures, it is now assumed that it takes two cycles (2τ) to transmit the system synchronizing signal from the pilot device 10 to the device 11, and it takes one cycle (1τ) to transmit the system synchronizing signal from the device 11 to the device 12. It is also assumed that processing in the device 11 requires one cycle (1τ) and processing in the device 12 requires two cycles (2τ).

By taking the transmission delay between the pilot device 10 and the device 11, the transmission delay caused by internal processing of the device 11, and the transmission delay between the device 11 and the device 12 into consideration, the initial value of the pilot device 10 is set to n, the initial value of the device 11 is set to n+3, and the initial value of the device 12 is set to n+6.

If a system synchronization signal is sent from the pilot device 10 as shown in FIG. 2A, the counter value of the pilot device 10 becomes n+2 when the system synchronization signal arrives at the device 11. Thereafter, the counter value of the pilot device 10 becomes n+3 one cycle later as shown in FIG. 2B, and the initial value n+3 is set in the counter 113 of the device 11. As a result, the pilot device 10 and the device 11 have the same counter value. Thus the device 11 is synchronized to the pilot device 10 in operation timing.

As shown in FIG. 2C, the system synchronizing signal sent from the device 11 arrives at the device 12 one cycle later, and the counter value of the pilot device 10 and the device 11 becomes n+4. Two cycles later, the counter value of the pilot device 10 and the devices 11 and 12 becomes n+6 as shown in FIG. 2D.

Thus, in the present embodiment, synchronization in operation timing among the pilot device 10 and the devices 11 and 12 is ensured by setting initial values in the counters with due regard to the transmission and delay values of the system synchronizing signal between devices connected in series. As for initial values set in the counters of the devices 11 to 16, however, suitable values are set by taking physical transmission delays between devices and processing delays within devices into consideration.

How to detect synchronizing discrepancy of operation timing in the devices 11 to 16 shown in FIG. 1 will now be described. FIG. 3 is a diagram showing how to detect synchronizing discrepancy of operation timing in the devices 11 to 16 shown in FIG. 1. However, it is now assumed that the counter 113 repeats counting ranging from 0 to 7, and the pilot device 10 sends out a system synchronizing signal every seven cycles. It is also assumed that an initial value of 5 has been set in the device 11 which receives the system synchronizing signal.

When the device 11 receives the system synchronizing signal from the pilot device 10 for the first time, the device 11 sets the initial value 5 in the counter 113. If the device 11 receives a system synchronizing signal 31 shown in FIG. 3 at certain time, therefore, the count value of the counter ought to be 5.

If the count value of the counter 113 is 4 when the device 11 has received a system synchronizing signal 32 as show in FIG. 3, it turns out that there is synchronization discrepancy because the count value differs from that which originally should be.

In such devices 11 to 16, therefore, the count value of the counter 113 is compared with the initial value when a system synchronizing signal is accepted from another device. If they coincide with each other, the operation timing is judged to be synchronized. If they do not coincide, synchronization discrepancy is judged to occur.

For convenience of description, it has been assumed that each of the devices 11 to 16 sets an initial value according to the initial value information in the counter 113 in the device only when the device accepts the system synchronizing signal for the first time. Alternatively, the device may set the initial value in the counter 113 when the device has accepted the system synchronizing signal which is accepted repetitively thereafter.

Originally, synchronization of the operation timing can be ensured by the first system synchronizing signal. If the devices 11 to 16 falsely senses noise or the like as the first system synchronizing signal, synchronization discrepancy occurs in operation timing among devices.

In this first embodiment, an initial value is generated by the initial value generation circuit 111 by taking the delay of signal wires between the pilot device 10 and the devices 11 to 16 and the processing delay within each device into consideration, as heretofore described. When the device has received a system synchronizing signal from another device, the device sets the initial value in the counter 113. Thus the counter value of the counter 113 of each of the devices 11 to 16 is made equal to the counter value of the counter 103 of the pilot device 10. As a result, synchronization of operation timing of the pilot device 10 and the devices 11 to 16 can be ensured efficiently.

In the description of the first embodiment, the pilot device 10 and the devices 11 to 16 have been described from the aspect of function. Accordingly, the pilot device 10 has been assumed to be somewhat different in configuration from the devices 11 to 16. As a matter of fact, however, they can be implemented as devices having the same configuration. In the case where the pilot device 10 and the devices are reset simultaneously, it is not sufficient to merely adjust the counter value and hold the operation timing, but it is necessary to assert the trigger signal to respective devices.

Figure 4:
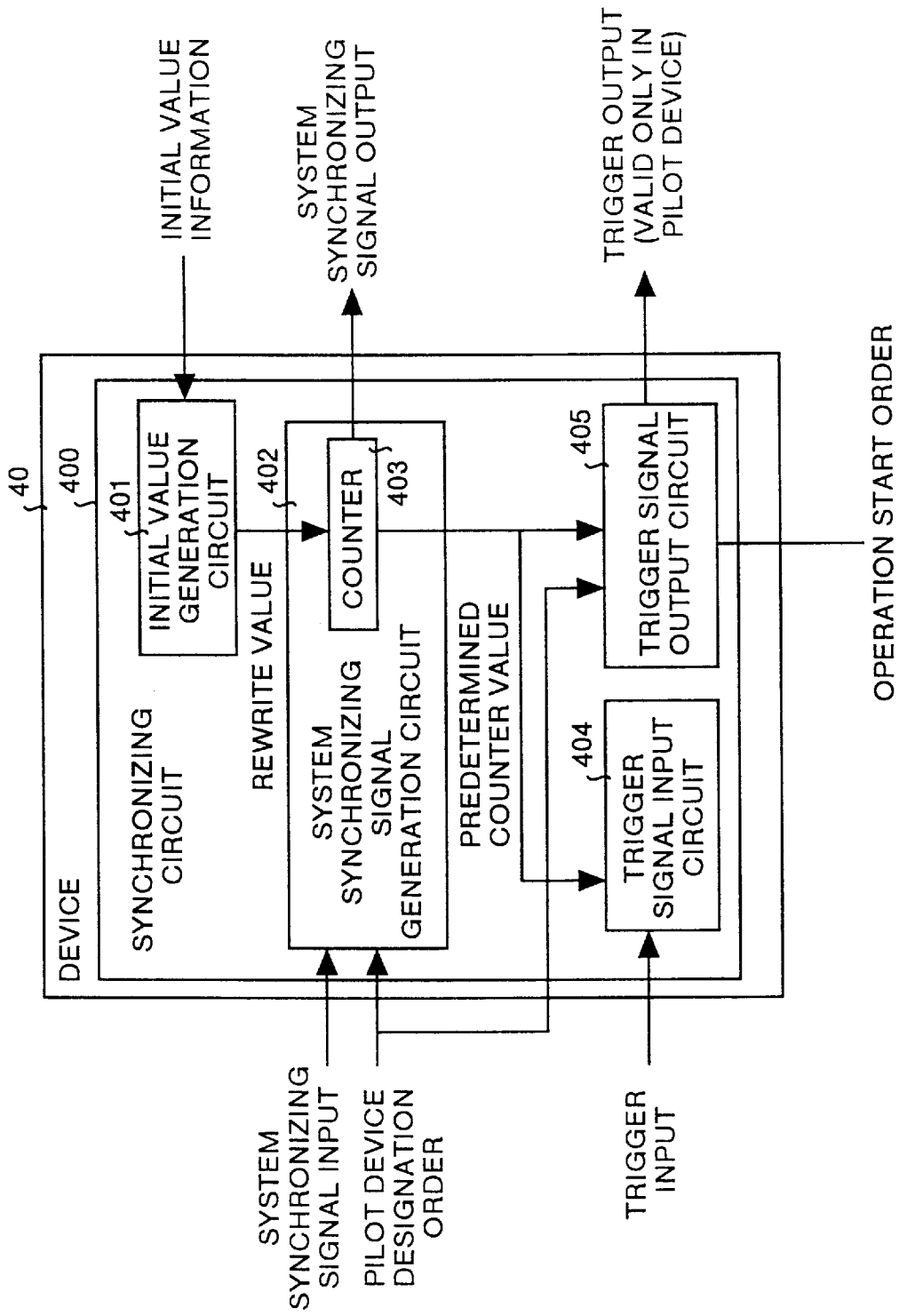
FIG. 4 is a diagram showing an example of a device circuit configuration which can be used for both a pilot device and other devices shown in FIG. 1.

In the second embodiment, therefore, a device configuration for meeting functions of both the pilot device 10 and the devices 11 to 16 will now be described, including the trigger signal input and output. FIG. 4 is a diagram showing an example of a device circuit configuration which can be used for both the pilot device 10 and other devices 11 to 16 shown in FIG. 1. For convenience of description, description of a circuit configuration other than a synchronizing circuit will be omitted.

As shown in FIG. 4, a device 40 includes an initial value generation circuit 401, a system synchronizing signal generation circuit 402 including a counter 403, a trigger signal input circuit 404, and a trigger signal output circuit 405. As already described, the initial value generation circuit 401 is a circuit for generating an initial value to be set in the counter 403 on the basis of initial value information.

The system synchronizing signal generation circuit 402 is a circuit which functions as the pilot device 10 shown in FIG. 1 in the case where a pilot device designation order is input, and which functions as the devices 11 to 16 in the case where the pilot device designation order is not input and a system synchronizing signal is input.

If the pilot device designation order is asserted and the system reset is canceled, then the initial value generated by the initial value generation circuit 401 is set in the counter 403, and the counter operation is started. In addition, the system synchronizing signal is output by one pulse, and thereafter the system synchronizing signal is output at predetermined intervals in the same way. If the system synchronizing signal is accepted, then the initial value generated by the initial value generation circuit 401 is set in the counter 403, the counter operation is started, and the system synchronizing signal is output.

The trigger signal input circuit 404 is a circuit which is activated no matter whether the device 40 is the pilot device 10 shown in FIG. 1 or one of the devices 11 to 16. In the case where the count value of the counter 403 becomes a predetermined value and a trigger input is accepted, the trigger signal input circuit 404 outputs a synchronizing operation start order such as a reset signal to a main body portion of the device 10 which is not illustrated.

The trigger signal output circuit 405 is a circuit which is activated only when the device 40 functions as the pilot device 10 shown in FIG. 1. In the case where a synchronizing operation order is given from the outside, the trigger signal output circuit 405 output a trigger to respective devices when the count value of the counter 403 has become a predetermined value. The trigger output having a counter period length output from the trigger signal output circuit 405 becomes the trigger input of other devices.

Figure 5:
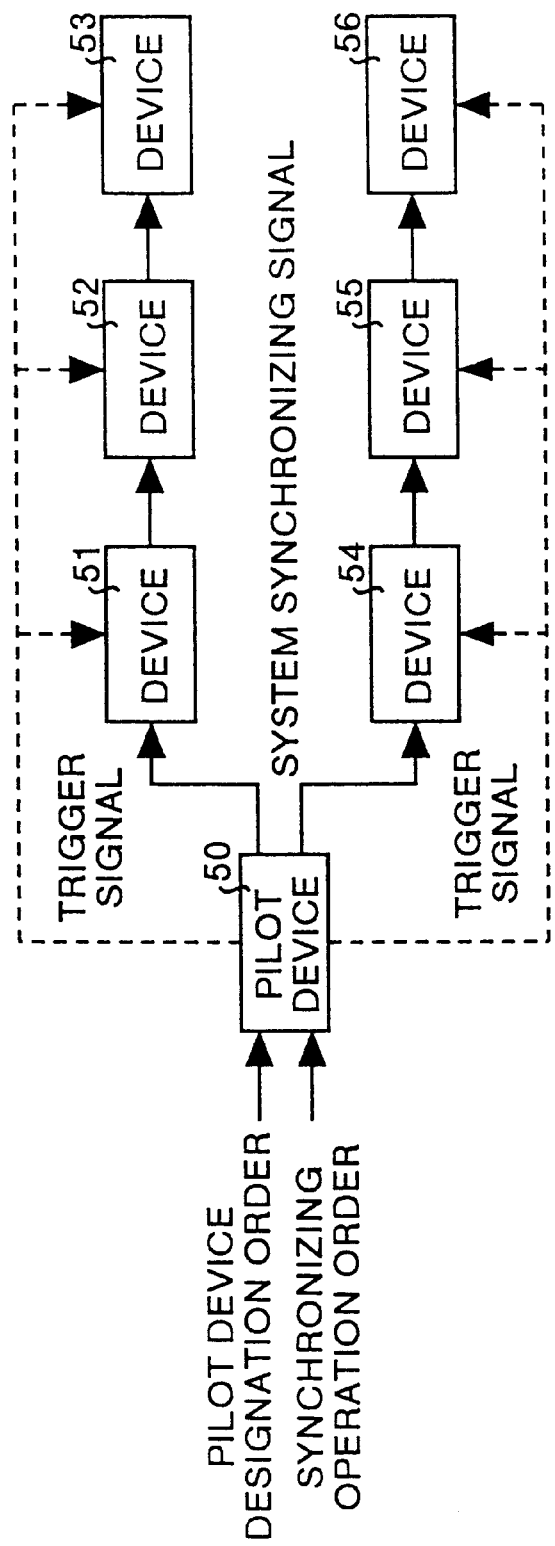
FIG. 5 is a diagram showing the system configuration of a timing synchronizing system using the devices shown in FIG. 4.

FIG. 5 is a diagram showing the system configuration of a timing synchronizing system using the devices shown in FIG. 4. As shown in FIG. 5, this timing synchronizing system includes a pilot device and devices 51 to 56. Each of the devices 50 to 56 has the device configuration shown in FIG. 4.

The device 50 which has accepted a pilot device designation order functions as a pilot device, and outputs a system synchronizing signal generated by the system synchronizing signal generation circuit 402 to the devices 51 and 54. Thereafter, the devices 51 and 54 output system synchronizing signals to the devices 52 and 55, respectively. Furthermore, the devices 52 and 55 output system synchronizing signals to the devices 53 and 56, respectively. As a result, the synchronization of operation timing of the devices 50 to 56 is ensured.

If the synchronizing operation order is issued to the pilot device 50, the trigger output circuit 405 of the pilot device issues a trigger output. Upon receiving the trigger output, the devices 51 to 56 starts synchronizing operation such as reset operation. In the present embodiment, the pilot device 50 issues the trigger output. Alternatively, another device may issue the trigger output.

In the foregoing description, the pilot device 50 issues only one trigger output. If the number of signal wires of the trigger signal is increased, or the trigger signal is formed of a sequence of pulses, however, the kinds of the synchronizing operation start order can also be increased.

Figure 6:
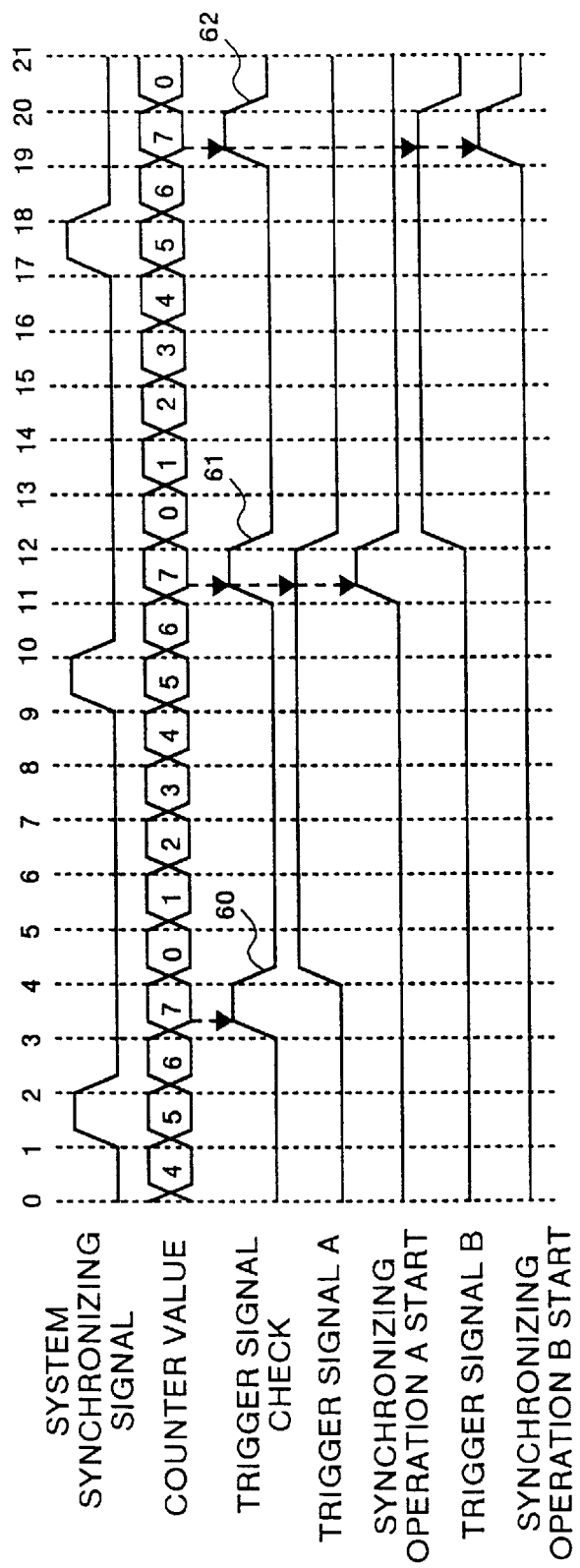
FIG. 6 is a time chart showing the case where a plurality of trigger signals are output from a pilot device shown in FIG. 5.

FIG. 6 is a time chart showing the case where a plurality of trigger signals are output from the pilot device 50 shown in FIG. 5. In this time chart, a trigger signal A is not input at the time of a first trigger signal check 60 as shown in FIG. 5. At the time of the next trigger signal check 61, input of the trigger signal A is detected. The trigger signal A is independent of the trigger signal B. At the time of a third trigger signal check, the input of the trigger signal A disappears and the trigger signal B is detected.

At the time of trigger check of the trigger signal A, synchronizing operation A is conducted. And at the time of trigger check of the trigger signal B, synchronizing operation B is conducted. By thus using a plurality of trigger signals, a plurality of synchronizing operations such as system reset and re-setup can be conducted.

In the case where one or more trigger signals are output, it is also possible to change the setting of the whole including the device 40 at arbitrary timing before trigger signal output, then output a trigger signal, start the synchronizing operation after the synchronizing operation start order has been asserted, and change the setting of the main body concurrently.

Figure 7:
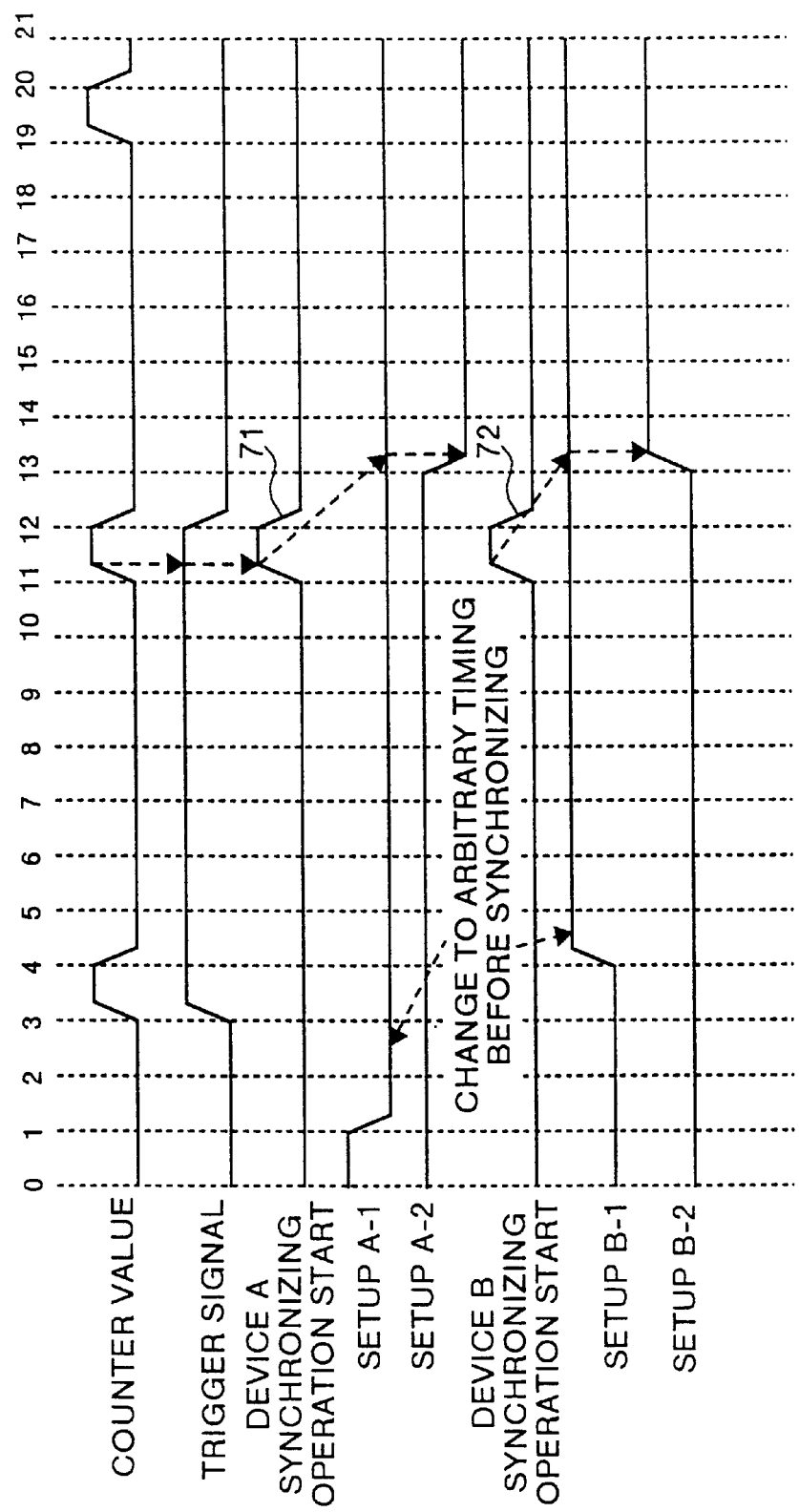
FIG. 7 is a time chart showing the case where trigger signals are output after setting has been changed at arbitrary timing before trigger signal outputting.

FIG. 7 is a time chart showing the case where trigger signals are output after setting has been changed at arbitrary timing before trigger signal outputting. In such a system, setup A-1 is set to a device A at arbitrary timing until the synchronizing operation start order is issued to the device A as shown in FIG. 7. Furthermore, setup B-1 is set to a device B at arbitrary timing until the synchronizing operation start order is issued to the device B.

If synchronizing operation start orders 71 and 72 are issued to the devices A and B, setup A-2 is set in the device A and setup B-2 is set in the device B at the timing.

In this way, it is possible that each device performs setup at arbitrary timing independently until the synchronizing operation start order is issued and the internal setup of each device is changed concurrently when the synchronizing operation start order is issued. The internal setup such as A-1, A-2, B-1, and B-2 can be changed to a specific one according to the kind of the trigger signal.

Figure 8:
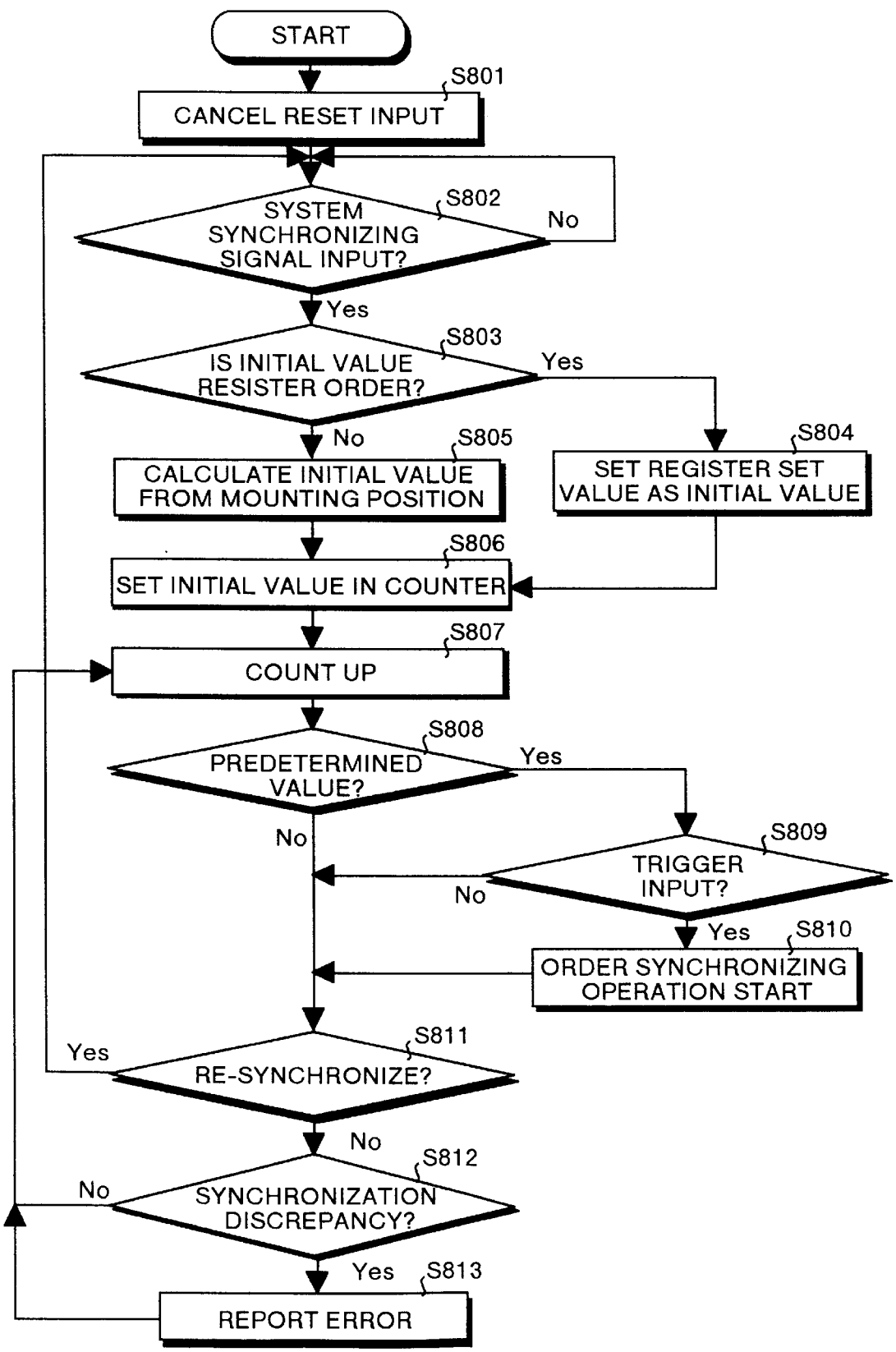
FIG. 8 is a flow chart showing a processing procedure in the case where the device shown in FIG. 4 serves as a device other than the pilot device.

A processing procedure of the case where the device 40 shown in FIG. 4 functions as a device other than the pilot device will now be described. FIG. 8 is a flow chart showing a processing procedure in the case where the device shown in FIG. 4 serves as a device other than the pilot device.

In the device 40, reset input is canceled (step S801). The device waits for input of a system synchronizing signal (negation of step S802). If a system synchronizing signal is input (affirmation of step S802), then it is determined whether the initial value is a register order (step S803), and either a value calculated from the mounting position or a value defined in a register is selected as the initial value of each device. In the case of a register order (affirmation of step S803), the register set value is set as the initial value (step S804).

If a register order is not received (negation of step S803), the initial value is calculated from the mounting position (step S805), and the calculated initial value is set in the counter 403 (step S806).

Thereafter, the counter 403 counts up according to the clock (step S807). It is determined whether the count value is a predetermined value (step S808). If the predetermined value is reached (affirmation of step S808), it is determined whether a trigger is input (step S809).

If a trigger is input (affirmation of step S809), a synchronizing operation start order is issued (step S810). If the count value of the counter 403 has not reached the predetermined value (negation of step S808) or a trigger is not input (negation of step S809), the processing proceeds to step S811.

Thereafter, it is determined whether a re-synchronizing order is issued (step S811). If a re-synchronizing order is issued (affirmation of step S811), the processing proceeds to the step S802 and similar processing is repeated. If a re-synchronizing order is not issued (negation of step S811), it is determined whether synchronization discrepancy is occurring (step S812).

If as a result synchronization discrepancy is not occurring (negation of step S812), the processing proceeds to the step S807 and similar processing is repeated. If synchronization discrepancy is occurring (affirmation of step S812), an error is reported (step S813).

In the second embodiment, the pilot device and other devices have the same configuration as heretofore described. If a pilot device designation order is input, the device functions as the pilot device 10 shown in FIG. 1. If the pilot device designation order is not input and a system synchronizing signal is input, the device functions as one of the devices 11 to 16. Therefore, such devices can be used widely and versatilely. As a result, the production cost of the devices can be reduced.

In the present embodiment, the pilot device and other devices are shown to be connected by signal wires. However, the present invention can be applied to such a case where the system scale becomes large and the system extends over a plurality of casings.

Figure 9:
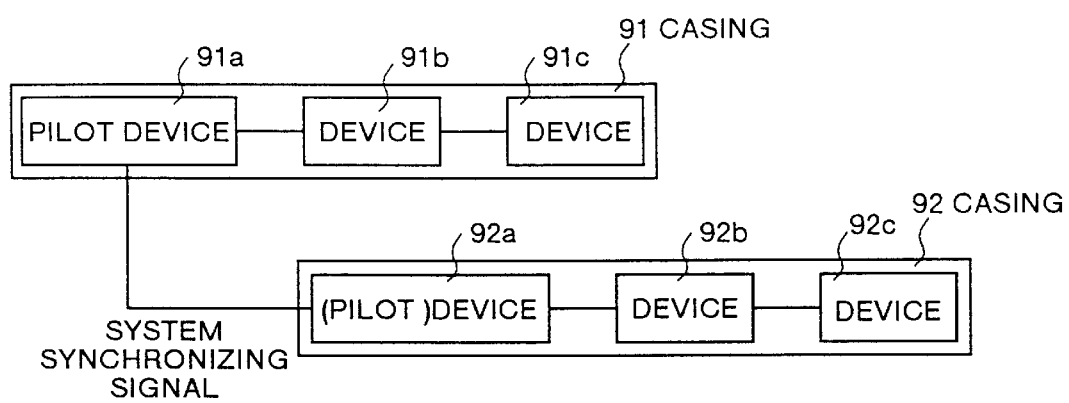
FIG. 9 is a diagram showing a system configuration in the case where the present invention is applied to a system having two casings.

FIG. 9 is a diagram showing a system configuration in the case where the present invention is applied to a system having two casings. As shown in FIG. 9, such a system has a casing 91 which includes a pilot device 91a, a device 91b, and a device 91c connected in series, and casing 92 which includes a pilot device 92a, a device 92b, and a device 92c connected in series.

Assuming that the pilot device 91a in the casing 91 generalizes the operation timing synchronization of the whole system, the pilot device 91a is connected to the pilot device 92a in the casing 92 and the pilot device 91a is made to send a system synchronizing signal to the pilot device 92a.

The pilot device 92a originally serves as a pilot device of the casing 92. However, the pilot device 92a has such a configuration as to function as a pilot device or an ordinary device as shown in FIG. 4. If a system synchronizing signal is sent to the pilot device 92a, therefore, the pilot device 92a functions as a mere ordinary device.

By thus providing the pilot device and other devices with the same configuration, even in a system extending over casings, it is possible to ensure the operation timing synchronization efficiently while maintaining the configuration of each of separate casings.

The first and second embodiments have been described placing the focus on the synchronizing circuit disposed in the pilot device and other devices. Therefore, the configuration and operation of circuits other than the synchronizing circuit will now be described.

Figure 10:
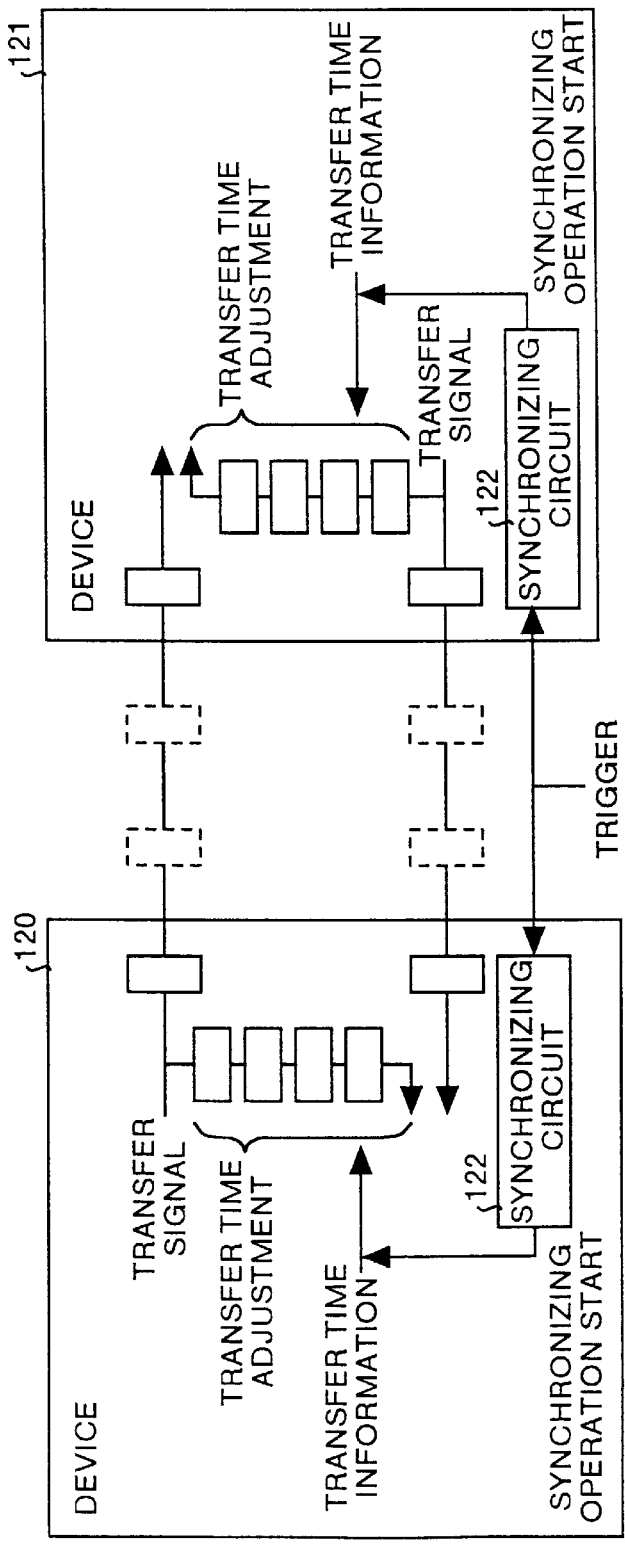
FIG. 10 is a diagram showing transfer time adjustment conducted within devices when data transfer is conducted between devices.

FIG. 10 is a diagram showing transfer time adjustment conducted within devices when data transfer is conducted between devices. FIG. 10 shows the case where signal transfer is conducted between devices 120 and 121 each including a synchronizing circuit 122. The synchronizing circuit 122 is the same as the synchronizing circuit 400 shown in FIG. 4. When accepting a trigger input from a pilot device which is not illustrated, the synchronizing circuit 122 outputs a synchronizing operation start order.

Each of the devices 120 and 121 shown in FIG. 10 has such a configuration as to conduct transfer time adjustment in the device according to the transfer time of the signal, transfer conducted between the devices when a synchronizing operation start order is supplied from the synchronizing circuit. The signal transfer conducted between the devices is independent of the signal of the synchronizing system. Since the cable is replaced according to the distance between the devices, data corresponding to the time equal to the transfer time of the cable is held in a chip. If the transfer time of the cable is $3\tau$, $3\tau$ is held in the chip as well.

In the case where transferred data is used within its own device, such data is output to outside and the data is received via a path having the same length as the transmission length as far as the transfer destination device, in the prior art. This complicates signal wires disposed around the device. By conducting the transfer time adjustment within the device respectively in the present embodiment, therefore, simplification of signal wires and reduction of physical resources are achieved.

Figure 11A:
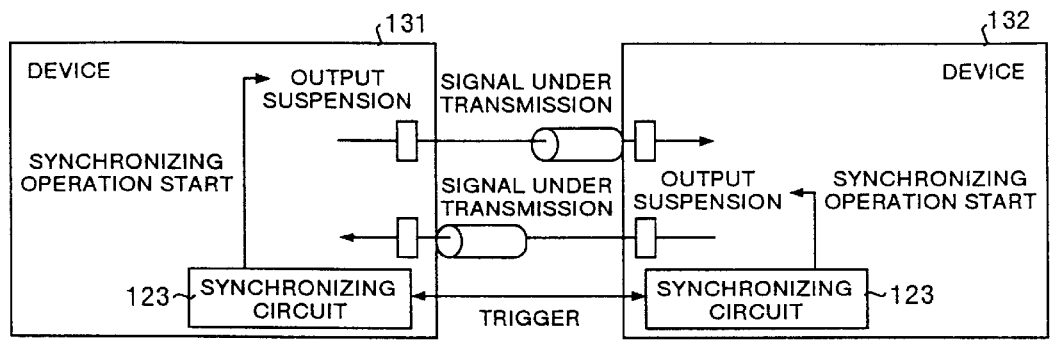
FIG. 11A to FIG. 11C are diagrams showing the case where sequence operations (output suspension of data transfer, input suspension, and input protection) are conducted consecutively in response to start of the synchronizing operation.
Figure 11B:
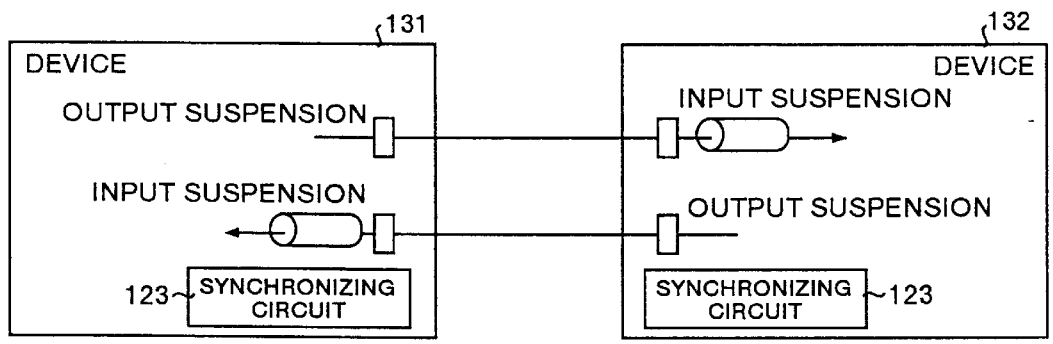
Figure 11C:
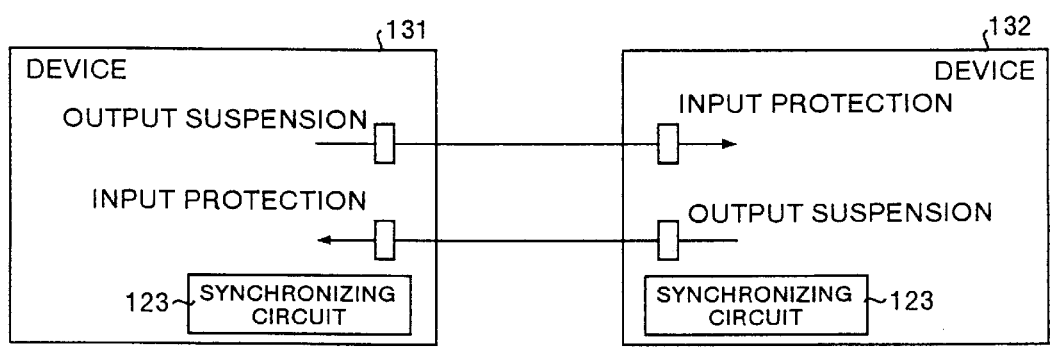

The case where sequence operation is conducted in response to the start of synchronizing operation will now be described. FIG. 11A to FIG. 11C are diagrams showing the case where output suspension of data transfer, input suspension, and input protection are conducted consecutively at the time of start of the synchronizing operation. The synchronizing circuit 123 is the same as the synchronizing circuit 400 shown in FIG. 4. When accepting a trigger input from a pilot device which is not illustrated, the synchronizing circuit 123 outputs a synchronizing operation start order.

If a synchronizing operation start order is output from the synchronizing circuit 122 as shown in FIG. 11A, the devices 131 and 132 start the sequence operation. If data (signal) is sent, the devices 131 and 132 stop the outputs. Thereafter, if the devices 131 and 132 receive data, respectively, as shown in FIG. 11B, the devices 131 and 132 stop the input. Furthermore, as shown in FIG. 11C, each of the devices 131 and 132 performs input protection.

By thus using the synchronizing circuit 123 having the configuration shown in FIG. 4, sequence operations including output suspension of data transfer, input suspension, and input protection can also be conducted in synchronism among a plurality of devices.

In this third embodiment, transfer time adjustment is conducted in each device as heretofore described. Therefore, simplification of signal wires and reduction of physical resources can be achieved. Furthermore, by forming the devices so that the sequence operation is started when a synchronizing operation start order is output from the synchronizing circuit 123, sequence operations such as output suspension of data transfer, input suspension, and input protection can also be conducted in synchronism among a plurality of devices.

Figure 12:
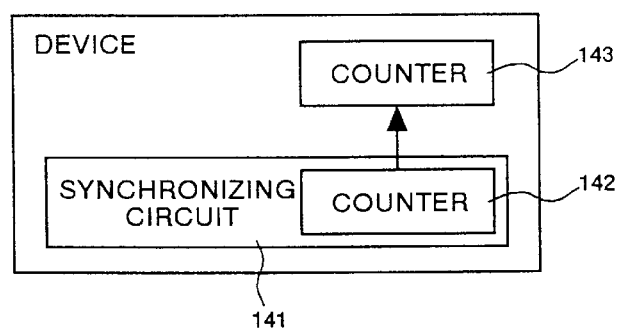
FIG. 12 is a diagram showing the case where a counter greater than a counter disposed within a synchronizing circuit is disposed outside the synchronizing circuit.
Figure 13:
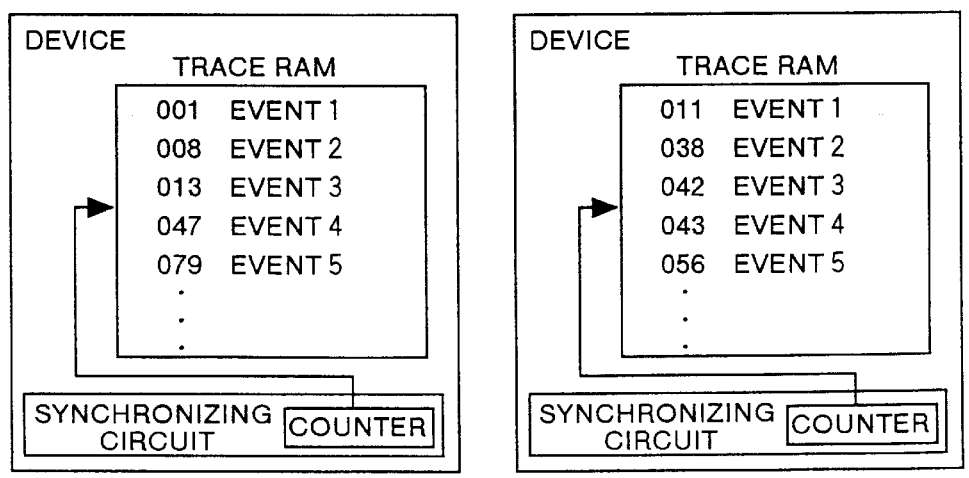
FIG. 13 is a diagram showing the case where a count value of the counter disposed within the synchronizing circuit is used for a trace.

In the first to third embodiments, synchronization of operation timing is implemented by using a counter in the synchronizing circuit. However, the present invention is not limited to this. As shown in FIG. 12, it is also possible to provide a counter 143 greater than a counter 142 disposed within a synchronizing circuit 141 is disposed outside the synchronizing circuit 141 and ensure the same value among all devices of the system by using the counter 143.

Further, in the first to third embodiments, the counters of respective devices forming the timing synchronizing system have the same count value. By holding the count value at the time of trace, it is possible to know the time relations of an observed event among devices.

According to one aspect of the present invention, counting by the first counting unit is started when the pilot device sends the synchronizing signal, and the second counting unit is made to conduct counting from a predetermined initial value when a device has received a synchronizing signal from the pilot device. This results in an effect that a timing synchronizing system capable of synchronizing the operation timing of the pilot device and the devices efficiently is obtained.

According to another aspect of the present invention, a device sends out a synchronizing signal as a pilot device and starts counting using the counting unit, if the device has received a predetermined pilot device designation order. When the device has received the synchronizing signal, the device causes the counting unit to conduct counting from the predetermined initial value. This results in an effect that devices can be used as both the pilot device and the devices.

Further, if the device has received the synchronizing signal, the device functions as an ordinary device and sets an initial value corresponding to a transmission delay value of the synchronizing signal as far as a transmission source device, in the counting unit. After setting the initial value, the device starts counting operation using the counting unit. This results in an effect that there are obtained devices capable of synchronizing the operation timing of the devices efficiently while taking the transmission delay value of the synchronizing signal between a transmission source device and the device.

Further, the device functions as an ordinary device and starts operation corresponding to a trigger, if the device receives a trigger and the count value of the counting unit is a predetermined value. This results in an effect that devices can be made to function simultaneously in response to a trigger.

Further, the device sends out a synchronizing signal and effects control so as to cause the counting unit to conduct count from the predetermined initial value, if the device has received the predetermined pilot device designation order. This results in an effect that there are obtained devices capable of effecting desired counting control responsive to a pilot device designation order.

Further, the device outputs a trigger corresponding to operation if the device receives a pilot device designation order and the predetermined operation start order. This results in an effect that there is obtained a device which can output a trigger only when two conditions, i.e., receipt of the pilot device designation order and receipt of the operation start order, are satisfied.

According to still another aspect of the present invention, counting by the first counting unit is started when the pilot device sends the synchronizing signal to the devices. When a device has received the synchronizing signal from the pilot device, the second counting unit is made to conduct counting from the predetermined initial value. This results in an effect that a timing synchronizing method capable of synchronizing the operation timing of the pilot device and the devices efficiently is obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A timing synchronizing system comprising:
   a pilot device which sends out a synchronizing signal; and
   a plurality of devices functioning at the same operation timing as that of said pilot device based on the synchronizing signal received from said pilot device,
   said pilot device having,
      a first counting unit which cyclically counts up to a predetermined first value; and
      a first control unit which provides a control so as to start counting by said first counting unit when said pilot device sends the synchronizing signal to said devices, and
   said devices having,
      a second counting unit which cyclically counts up to the first value; and
      a second control unit which in response to receipt of the synchronizing signal from said pilot device provides a control so as to start counting by said second counting unit from a predetermined second value.

2. A device which receives a synchronizing signal from a pilot device and functions with a same operation timing as that of said pilot device, said device comprising:
   a counting unit which cyclically counts up to a predetermined first value;
   a control unit which in response to receipt of the synchronizing signal from said pilot device provides a control so as to start counting by said counting unit from a predetermined second value; and
   a value setting unit which in response to receipt of the synchronizing signal from said pilot device sets the second value in said counting unit, the second value corresponding to a delay time required for transmission up to said pilot device from which the synchronizing signal is received,
   wherein said control unit, in response to completion of setting of the second value by said value setting unit, provides the control so as to start counting by said counting unit.

3. The device according to claim 2, further comprising:
   a trigger receiving unit which receives a trigger from an another device; and
   a judging unit which judges, when said trigger receiving unit receives the trigger, whether the value counted by said counting unit is equal to a predetermined third value,
   wherein said control unit provides the control so as to start an operation corresponding to the trigger when said judging unit judges that the value counted by said counting unit is equal to the third value.

4. The device according to claim 2, further comprising:
   a first judging unit which judges whether an order for changing a status of said device to the pilot device is received; and
   a signal generation unit which generates a synchronizing signal when said first judging unit judges that the order is received,
   wherein said control unit provides the control so as to start counting by said counting until from the second value.

5. The device according to claim 4, further comprising:
   a second judging unit which judges whether a predetermined operation start order is received; and
   a trigger output unit which, when said first and second judging units judge that respective orders are received, outputs a trigger corresponding to the operation.

6. A timing synchronizing method for a system including a pilot device which sends out a synchronizing signal, and a plurality of devices functioning at a same operation timing as that of said pilot device based on the synchronizing signal received from said pilot device, said timing synchronizing method comprising the steps of:
   said pilot device sending the synchronizing signal to said devices and starting cyclically counting up to a predetermined first value; and
   said device other than said pilot device receiving the synchronizing signal from said pilot device and starts cyclically counting from a predetermined second value up to the first value.

* * * * *